(12) United States Patent
Li et al.

(10) Patent No.: US 12,246,320 B2
(45) Date of Patent: Mar. 11, 2025

(54) CASSETTE AND EMBEDDING METHOD USING SAME

(71) Applicant: LEICA BIOSYSTEMS NUSSLOCH GMBH, Nussloch (DE)

(72) Inventors: Zhongqiu Li, Shanghai (CN); Jue Chen, Shanghai (CN); Xufeng Yu, Shanghai (CN); Ying Xie, Shanghai (CN)

(73) Assignee: Leica Biosystems Nussloch GmbH, Nussloch (DE)

( * ) Notice: Subject to any disclaimer, the term of this patent is extended or adjusted under 35 U.S.C. 154(b) by 0 days.

(21) Appl. No.: 18/687,353

(22) PCT Filed: Nov. 10, 2021

(86) PCT No.: PCT/CN2021/129716
§ 371 (c)(1),
(2) Date: Feb. 28, 2024

(87) PCT Pub. No.: WO2023/082080
PCT Pub. Date: May 19, 2023

(65) Prior Publication Data
US 2025/0001418 A1    Jan. 2, 2025

(51) Int. Cl.
*G01N 1/00* (2006.01)
*B01L 3/00* (2006.01)
*G01N 1/36* (2006.01)

(52) U.S. Cl.
CPC ............... *B01L 3/508* (2013.01); *G01N 1/36* (2013.01); *G01N 2001/366* (2013.01)

(58) Field of Classification Search
None
See application file for complete search history.

(56) References Cited

U.S. PATENT DOCUMENTS

| 8,329,120 | B2 | 12/2012 | Williamson, IV et al. |
| 2012/0258027 | A1 | 10/2012 | Clark |

FOREIGN PATENT DOCUMENTS

| CN | 204903260 U | 12/2015 |
| CN | 206725325 U | 12/2017 |
| CN | 109443897 A | 3/2019 |
| CN | 211904848 U | 11/2020 |
| JP | 2015111112 A | 6/2015 |

*Primary Examiner* — Jyoti Nagpaul
(74) *Attorney, Agent, or Firm* — Kinney & Lange, P.A.

(57) ABSTRACT

A cassette and an embedding method using the same are provided. The cassette includes: a frame including an accommodating member, the accommodating member defining an accommodating chamber and configured to accommodate the tissue in the accommodating chamber, the accommodating chamber having a first opening and a second opening opposite to each other; a first holder detachably connected to the frame, and closing the first opening of the accommodating chamber; and a second holder connected to the frame, and configured to slide relative to the frame to open or close the second opening of the accommodating chamber.

14 Claims, 7 Drawing Sheets

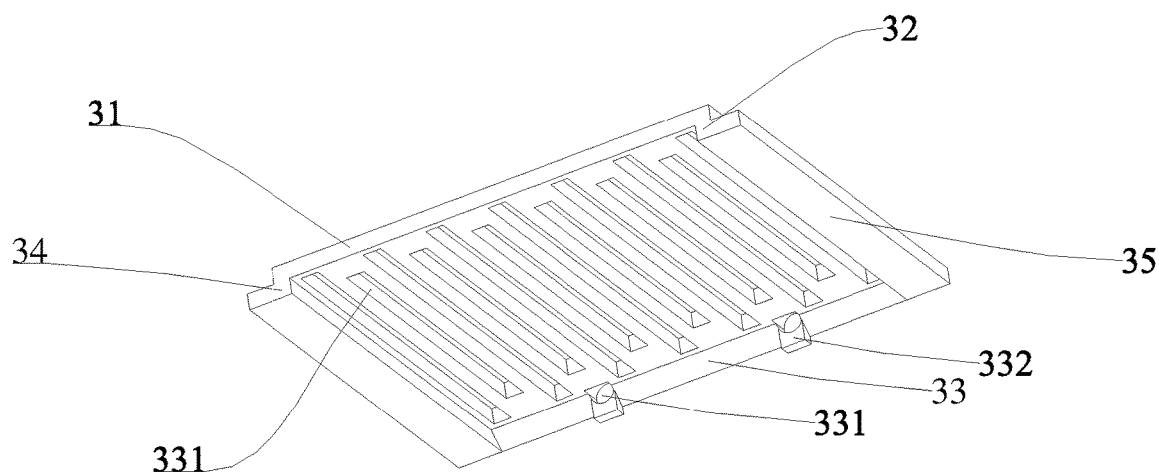
Fig. 9
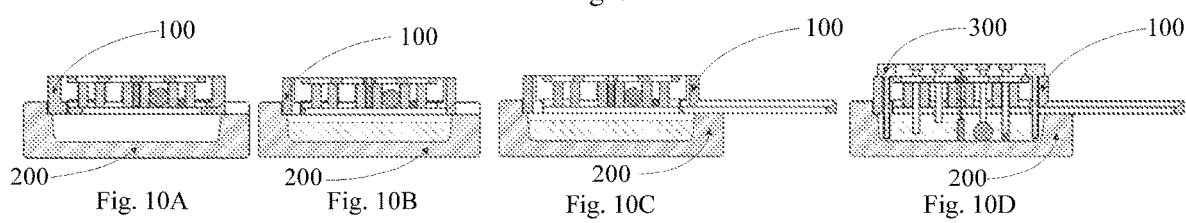
Fig. 10A  Fig. 10B  Fig. 10C  Fig. 10D
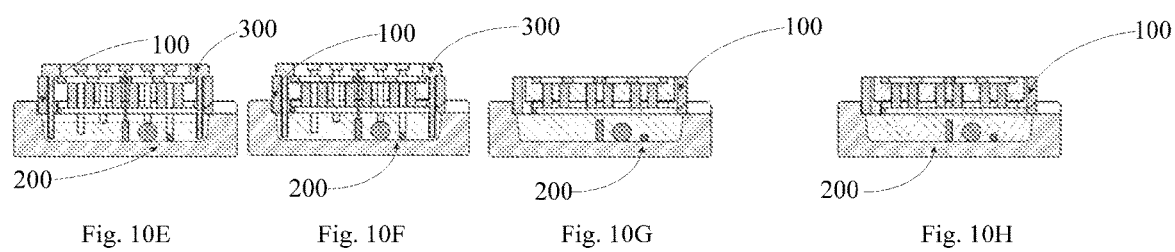
Fig. 10E  Fig. 10F  Fig. 10G  Fig. 10H
Fig. 10

1000

1001 placing the cassette with the tissue on a mold, in which the first holder closes the first opening of the accommodating member and the second holder closes the second opening of the accommodating member

1002 dispensing liquid paraffin into the mold and the cassette, and cooling the liquid paraffin in the mold to a semi-molten state

1003 sliding the second holder to open the second opening of the accommodating chamber

1004 pushing the tissue into the mold

1005 sliding the second holder to close the second opening of the accommodating chamber

1006 dispensing further liquid paraffin into the mold and the cassette

1007 cooling the liquid paraffin in the cassette and the mold to a solid state

Fig. 11

CASSETTE AND EMBEDDING METHOD USING SAME

FIELD

The present disclosure relates to a field of tissue processing and embedding, and more particularly to a cassette and an embedding method using the same.

BACKGROUND

A biopsy is the removal of a tissue sample to examine tissue for signs of cancer or other disorders. Tissue samples are obtained in a variety of ways using various medical procedures involving a variety of the sample collection devices. For example, biopsies may be open (surgically removing tissue) or percutaneous (e.g. by fine needle aspiration, core needle biopsy or vacuum assisted biopsy).

After the tissue sample is collected, the tissue sample is analyzed at a lab (e.g. a pathology lab, biomedical lab, etc.) that is set up to perform the appropriate tests (such as histological analysis). In order to properly process the tissue sample, a series of steps may be performed, including: grossing of the tissue sample by cutting the tissue sample to the proper size for analysis; processing of the tissue sample to immobilize molecular components and/or prevent degradation, generally including fixation, dehydration, and clearing of the tissue sample; embedding the tissue sample in an embedding material, such as paraffin wax; sectioning the embedded tissue sample by using, for example, a microtome.

Currently, after the processing of the tissue sample, a user needs to open the cassette and transfer the tissue sample to an embedding mold, and also needs to orientate and embed the tissue sample, which will reduce the user's working efficiency.

U.S. Pat. No. 8,329,120B2 relates to tissue orientation devices which include a perforated tissue support with at least one perforated channel for receiving a tissue sample, and a plurality of tabs configured to extend along and into the channel to retain the tissue sample during processing and embedding. Tissue orientation devices include elongated legs coupled together for holding one or more biopsy tissue samples therebetween. Associated methods include using the cassettes and orientation devices to hold and orient tissue samples for processing, embedding and microtome sectioning.

Although the above devices or methods allow the tissue sample to be embedded relatively conveniently, the user needs to section the cassette material, which will decrease the life of the microtome blade and reduce the sectioning efficiency and the slides quality due to micro defects on the blade edge caused by the cassette material. Further, the residual of the cassette material around or beside the tissue will impact the sides viewing and diagnosing.

SUMMARY

Embodiments of the present disclosure seek to solve at least one of the problems existing in the prior art to at least some extent, and thus provide a cassette and an embedding method using the same.

According to embodiments of the present disclosure, there is provided a cassette for a tissue. The cassette includes: a frame including an accommodating member, the accommodating member defining an accommodating chamber and configured to accommodate the tissue in the accommodating chamber, the accommodating chamber having a first opening and a second opening opposite to each other; a first holder detachably connected to the frame, and closing the first opening of the accommodating chamber; and a second holder connected to the frame, and configured to slide relative to the frame to open or close the second opening of the accommodating chamber.

In the cassette according to the embodiments of the present disclosure, since the first holder is detachably connected to the frame and the second holder is slidably connected to the frame, they can be operated to open or close the openings of the accommodating chamber during processing and embedding of the tissue, so that the tissue does not need to be taken out of the cassette and further transferred to a mold, and a paraffin block including the tissue can be obtained without the second holder (i.e. a bottom part of the cassette). That is, the bottom part of the cassette does not need to be cut, and no cassette material remains around the tissue. Thus, the lifetime of a blade of a microtome is improved, and the slides quality and the slides viewing and diagnosing are improved. Further, it is easy and convenient to embed the tissue with the cassette, thus enhancing the working efficiency of a user.

In some embodiments, the frame includes a peripheral wall, and the accommodating member is surrounded by the peripheral wall, the peripheral wall includes a first pair of opposite side portions and a second pair of opposite side portions, the first pair of opposite side portions are connected between the second pair of opposite side portions, the accommodating member includes a plurality of beams arranged parallel to and spaced apart from one another, each two adjacent beams define the accommodating chamber therebetween, and each beam is arranged between and connected to the first pair of opposite side portions of the peripheral wall.

In some embodiments, each of the first pair of opposite side portions of the peripheral wall has a mounting notch in an end adjacent to the first opening of the accommodating member, the mounting notches of the first pair of opposite side portions of the peripheral wall open towards each other, and a plurality of positioning members are provided in the mounting notch and arranged on two opposite side walls of the mounting notch.

In some embodiments, the first holder includes: a plate body; and a mounting protrusion arranged on each of two side walls of the plate body facing away from each other. The two side walls of the plate body are opposite to the first pair of opposite side portions of the peripheral wall, respectively. The mounting protrusion is mounted in the mounting notch and positioned by the plurality of positioning members.

In some embodiments, the first holder further includes a first through hole in a center of the plate body, and a plurality of second through holes surrounding the first through hole, the plurality of second through holes are arranged in columns and rows, and the second through holes arranged in each column or in each row at least partially overlap with a corresponding accommodating member.

In some embodiments, each of the first pair of opposite side portions of the peripheral wall is provided a first flange at an end adjacent to the second opening of the accommodating chamber, the first flanges at the first pair of opposite side portions of the peripheral wall extend toward each other, and each first flange defines a sliding channel together with a corresponding one of the first pair of opposite side portions of the peripheral wall.

In some embodiments, an inner surface of each of the first pair of opposite side portions of the peripheral wall includes a step between an end adjacent to the first opening of the accommodating chamber and the end adjacent to the second opening of the accommodating chamber, each first flange and the step of the corresponding one of the first pair of opposite side portions of the peripheral wall define the sliding channel therebetween.

In some embodiments, one of the second pair of opposite side portions of the peripheral wall is provided with a recess to expose the sliding channels at the first pair of opposite side portions of the peripheral wall and to allow the second holder to pass through, and the other one of the second pair of opposite side portions of the peripheral wall blocks the sliding channels at the first pair of opposite side portions of the peripheral wall.

In some embodiments, the second holder includes: a base plate provided with a plurality of third through holes; first to third side walls arranged on the base plate and connected in sequence along a periphery of the base plate, the first side wall being opposite to the third side wall, the second side wall being connected between the first side wall and the third side wall; and a second flange arranged to an end of each of the first side wall and the third side wall away from the base plate, the second flanges at the first side wall and the third side wall extending away from each other, the second flange being fitted in the sliding channel and configured to slide in the sliding channel.

In some embodiments, the plurality of third through holes are parallel to one another and arranged in a direction parallel to an extension direction of the plurality of beams, a size of the third through in a direction perpendicular to the extension direction of the plurality of beams is less than a size of the accommodating chamber in the direction perpendicular to the extension direction of the plurality of beams.

In some embodiments, the plurality of third through holes are parallel to one another and arranged in a direction intersecting with an extension direction of the plurality of beams at an included angle, and the included angle is less than or equal to 90 degrees, and larger than 0 degrees.

In some embodiments, the second side wall of the second holder is provided with an actuating hole and a positioning protrusion aligned with the actuating hole, and the positioning protrusion extends from a surface of the second side wall facing away from the base plate in a direction running away from the base plate.

In some embodiments, the one of the second pair of opposite side portions of the peripheral wall is provided with a positioning groove corresponding to the positioning protrusion of the second side wall of the second holder, and the positioning protrusion is configured to be fitted in the positioning groove when the second holder closes the second opening of the accommodating chamber.

In some embodiments, surfaces of the second side wall of the second holder and the one of the second pair of opposite side portions of the peripheral wall, which face towards each other, are inclined in a same direction, so that the surface of the second side wall of the second holder is fitted with the surface of the one of the second pair of opposite side portions of the peripheral wall when the second holder closes the second opening of the accommodating chamber.

Embodiments of the present disclosure further provide an embedding method, which uses the cassette according to any one of the above embodiments. The embedding method includes: placing the cassette with the tissue on a mold, in which the first holder closes the first opening of the accommodating chamber, and the second holder closes the second opening of the accommodating chamber; dispensing liquid paraffin into the mold and the cassette, and cooling the liquid paraffin in the mold to a semi-molten state; sliding the second holder to open the second opening of the accommodating chamber; pushing the tissue into the mold; sliding the second holder to close the second opening of the accommodating chamber; dispensing further liquid paraffin into the mold and the cassette; and cooling the liquid paraffin in the cassette and the mold to a solid state.

In the embedding method according to the embodiments of the present disclosure, since the first holder is detachably connected to the frame and the second holder is slidably connected to the frame, they can be operated to open or close the openings of the accommodating chamber in corresponding steps, so that the tissue can be pushed into the mold without being taken out of the cassette, and the paraffin block including the tissue can be obtained without the second holder (i.e. a bottom part of the cassette). That is, the bottom part of the cassette does not need to be cut, and no cassette material remains around the tissue. Thus, the lifetime of a blade of a microtome is improved, and the slides quality and the slides viewing and diagnosing are improved. Further, it is easy and convenient to embed the tissue with the embedding method, thus enhancing the working efficiency of a user.

In some embodiments, the tissue is pushed into the mold by a pusher, and the embedding method further includes withdrawing the pusher after or before dispensing further liquid paraffin into the mold and the cassette.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference the accompanying drawings.

FIG. 9 is another perspective view of a second holder of a cassette according to an embodiment of the present disclosure.

FIG. 10 is a perspective view illustrating an embedding method according to an embodiment of the present disclosure.

FIG. 11 is a block diagram of an embedding method according to an embodiment of the present disclosure.

DETAILED DESCRIPTION

Figure 1:
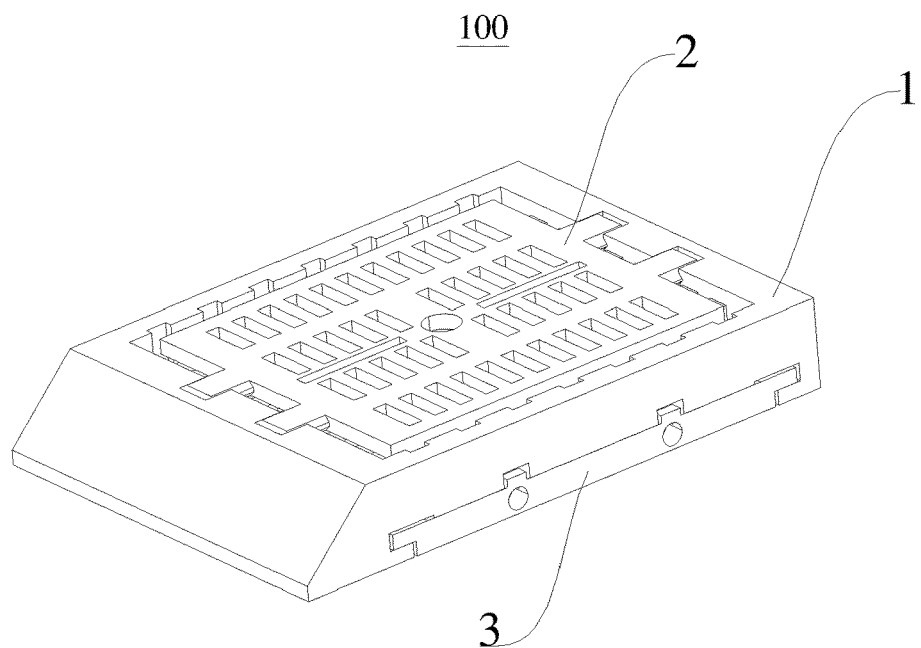
FIG. 1 is a perspective view of a cassette with a tissue according to an embodiment of the present disclosure.
Figure 2:
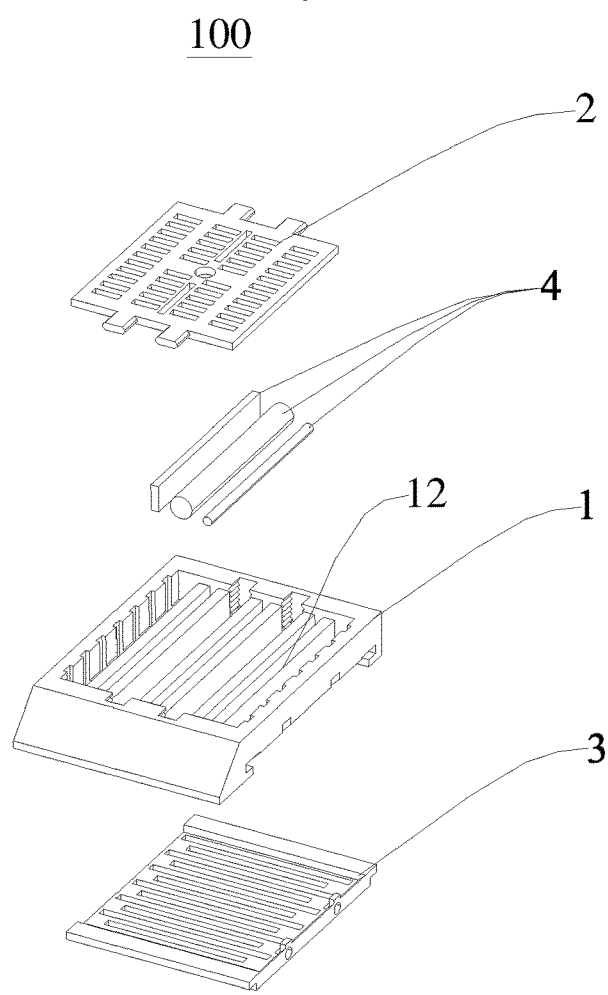
FIG. 2 is an exploded view of a cassette with a tissue according to an embodiment of the present disclosure.
Figure 3:
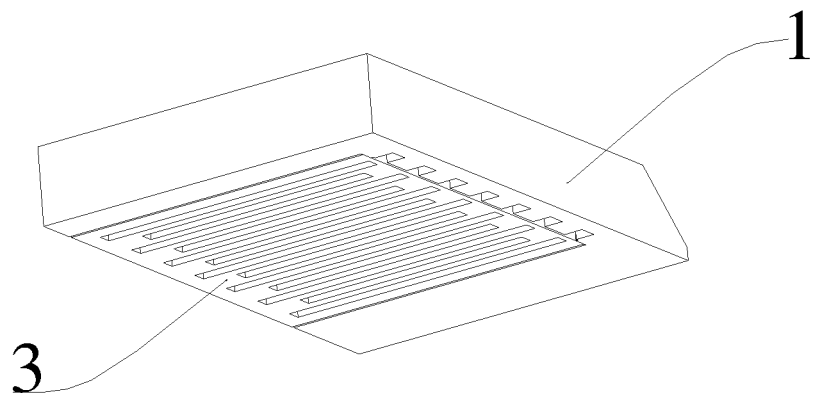
FIG. 3 is another perspective view of a cassette with a tissue according to an embodiment of the present disclosure.
Figure 4:
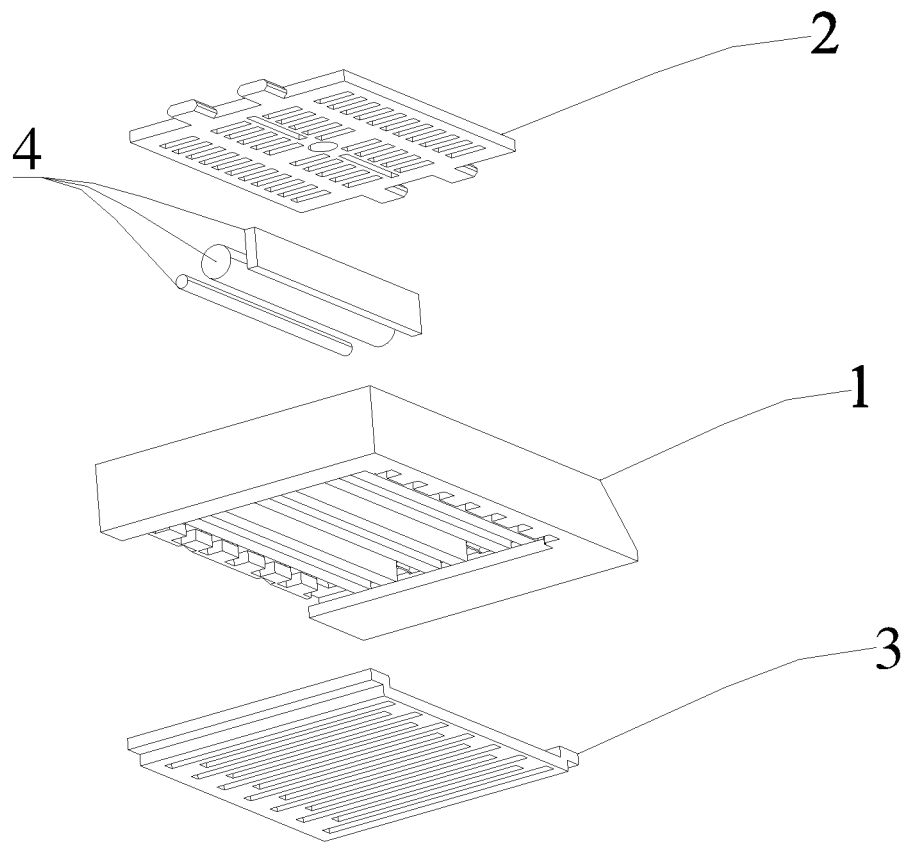
FIG. 4 is another exploded view of a cassette with a tissue according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front." "rear," and the like) are only used to simplify description of the present disclosure, and do not alone indicate or imply that the device or element referred to must have a particular orientation.

In addition, terms such as "first" and "second" are used herein for purposes of description and are not intended to indicate or imply relative importance or significance.

Embodiments of the present disclosure provide a cassette 100 for a tissue 4, as shown in FIGS. 1-4. The cassette 100 includes a frame 1, a first holder 2 and a second holder 3. The frame 1 includes an accommodating member 12, and the accommodating member 12 defines an accommodating chamber 121 and is configured to accommodate the tissue 4 in the accommodating chamber 121. The accommodating chamber 121 has a first opening 1211 and a second opening 1212 opposite to each other. The tissue 4 may be placed into the accommodating chamber 121 through the first opening 1211, and pushed out of the accommodating chamber 121 through the second opening 1212. The first holder 2 is detachably connected to the frame 1, and closes the first opening 1211 of the accommodating chamber 121. For example, the first holder 2 may be detached from the frame 1 to open the first opening 1211 of the accommodating chamber 121, so that the tissue 4 can be placed into the accommodating chamber 121 through the first opening 1211. Further, the first holder 2 may be connected to the frame to close the first opening 1211 of the accommodating chamber 121 after the tissue 4 is placed into the accommodating chamber 121, so as to hold the tissue 4 in the accommodating chamber 121. The second holder 3 is connected to the frame 1, and configured to slide relative to the frame 1 to open or close the second opening 1212 of the accommodating member 121. For example, the second holder 3 may be slid into the frame 1 to close the second opening 1212 of the accommodating chamber 121, so as to hold the tissue 4 in the accommodating chamber 121. Further, the second holder 3 may be slid out of the frame 1 to open the second opening 1212 of the accommodating chamber 121, so that the tissue 4 in the accommodating chamber 121 can be pushed out of the accommodating chamber 121 through the second opening 1212.

In some embodiments of the present disclosure, the first holder 2 may be configured as a cover part of the cassette 100, and the second holder 3 may be configured as a bottom part of the cassette 100. Accordingly, the frame 1 is arranged between the first holder 2 and the second holder 3, the first holder 2 is arranged on an upper side of the frame 1, and the second holder 3 is arranged on a lower side of the frame 1.

In the cassette 100 according to the embodiments of the present disclosure, since the first holder 2 is detachably connected to the frame 1 and the second holder 3 is slidably connected to the frame 1, they can be operated to open or close the openings of the accommodating chamber 121 during processing and embedding of the tissue 4, so that the tissue 4 does not need to be taken out of the cassette 100 and further transferred to a mold, and a paraffin block including the tissue 4 can be obtained without the second holder 3 (i.e. the bottom part of the cassette 100). That is, the bottom part of the cassette 100 does not need to be cut, and no cassette material remains around the tissue 4. Thus, the lifetime of a blade of a microtome is improved, and the slides quality and the slides viewing and diagnosing are improved. Further, it is easy and convenient to embed the tissue 4 with the cassette 100, thus enhancing the working efficiency of a user.

Figure 5:
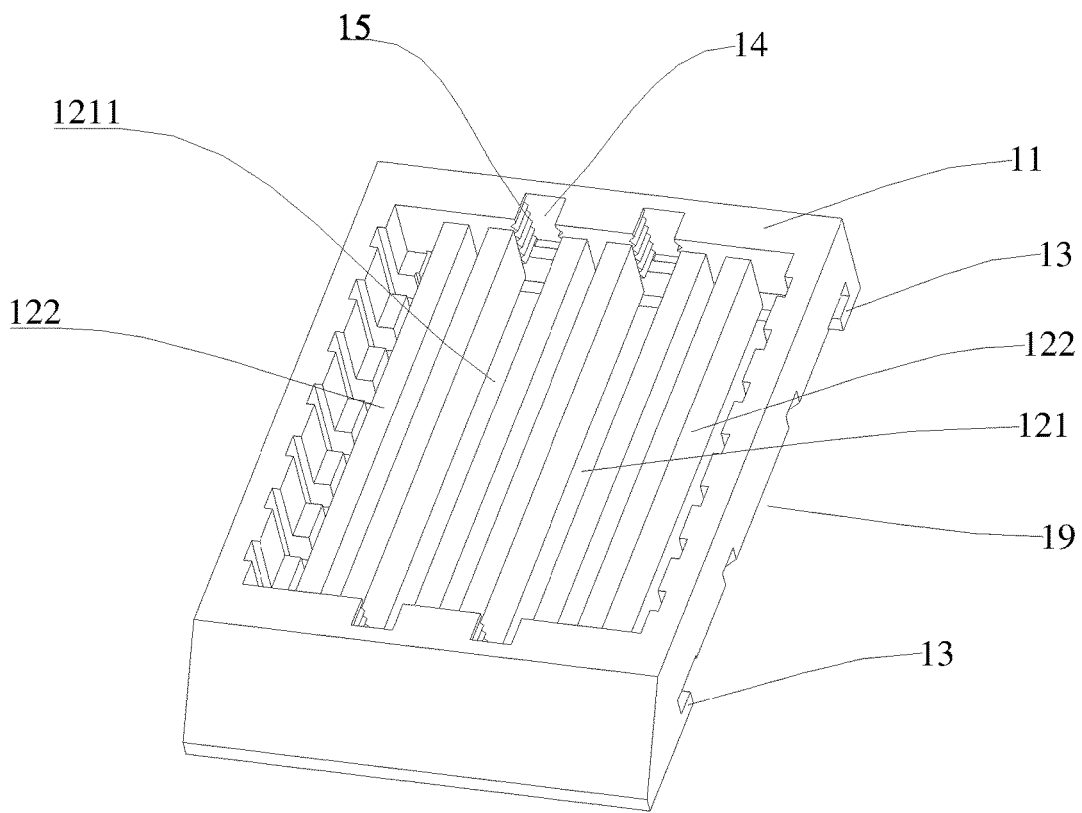
FIG. 5 is a perspective view of a frame of a cassette according to an embodiment of the present disclosure.
Figure 6:
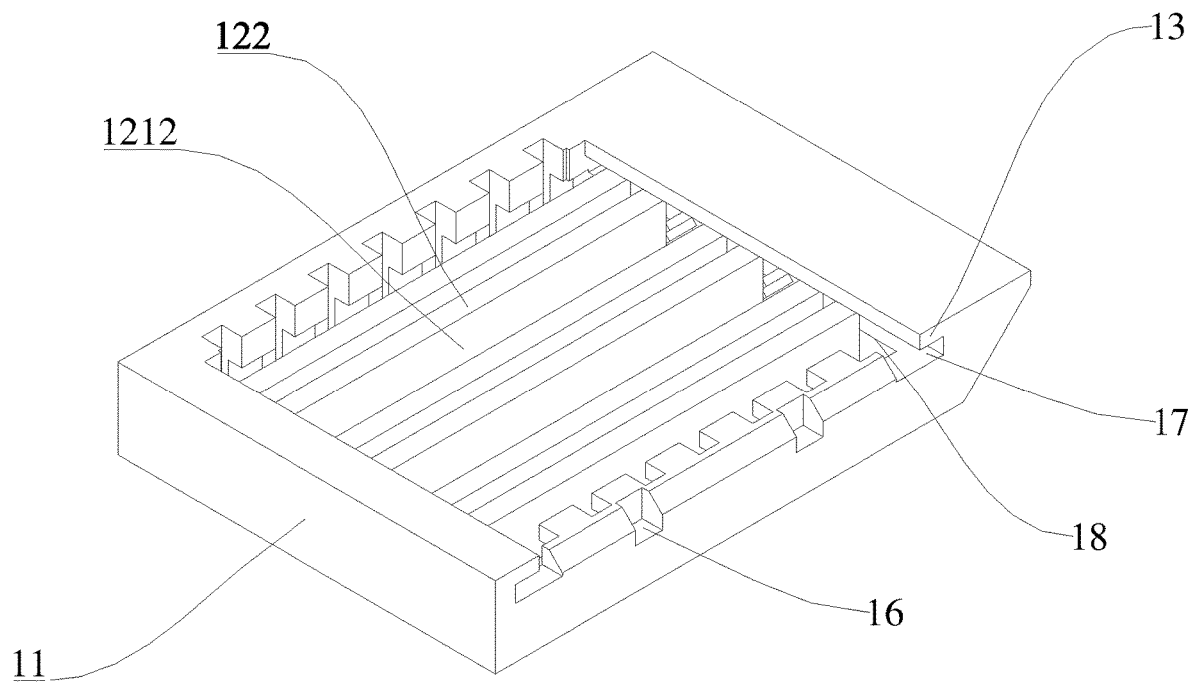
FIG. 6 is another perspective view of a frame of a cassette according to an embodiment of the present disclosure.

In some embodiments of the present disclosure, as further shown in FIGS. 5 and 6, the frame 1 includes a peripheral wall 11, and the accommodating member 12 is surrounded by the peripheral wall 11. The peripheral wall 11 includes a first pair of opposite side portions and a second pair of opposite side portions, the first pair of opposite side portions are connected between the second pair of opposite side portions. For example, the peripheral wall 11 includes first to fourth side portions connected end to end in sequence, the first side portion is opposite to the third side portion, the second side portion is opposite to the fourth side portion, and the first side portion and the third side portion are connected between the second side portion and the fourth side portion. The accommodating member 12 is connected between the first side portion and the third side portion.

Further, the accommodating member 12 includes a plurality of beams 122 arranged parallel to and spaced apart from one another, each two adjacent beams 122 define the accommodating chamber 121 therebetween, and each beam 122 is arranged between and connected to the first pair of opposite side portions of the peripheral wall 11. Thus, a plurality of accommodating chambers 121 can be defined by the plurality of beams 122, so that a plurality of tissues 4 can be processed and embedded in the plurality of accommodating chambers 121 at the same time. Thus, the efficiency of tissue processing and embedding can be improved.

Further, the plurality of accommodating chambers 121 may differ from one another in size, so that the tissues 4 of different sizes can be processed and embedded. For example, the plurality of accommodating chambers 121 are cuboid, and have the same length as well as different widths and/or heights. Thus, various requirements for the tissues 4 can be satisfied, and the adaptability of the cassette 100 can be improved. However, the present disclosure is not limited to this, that is, the plurality of accommodating chambers 121 may also have the same size.

In some embodiments, surfaces (i.e. inner surfaces in FIGS. 5 and 6) of the second pair of opposite side portions of the peripheral wall 11, which face towards each other, are provided with gaps extending vertically, so that reagents for processing and embedding of the tissue 4, such as a dehydration reagent and paraffin, can pass through the cassette 100 smoothly, thus facilitating the processing and embedding of the tissue 4. Further, these gaps improve the stability of the paraffin block and facilitate the removal of the paraffin block.

Further, the surfaces of the second pair of opposite side portions of the peripheral wall 11, which face towards each other, have a step between an upper end and a lower end of the side portion of the peripheral wall 11, so that each of the second pair of opposite side portions of the peripheral wall 11 has a narrow upper end and a wide lower end. Thus, the second pair of opposite side portions of the peripheral wall 11 will not interference with the first holder 2 when the first holder 2 is connected to the frame 1, and also the strength of the second pair of opposite side portions of the peripheral wall 11 can be ensured. Herein, it should be noted that a vertical direction can be interpreted as an up-down direction in the present disclosure, and the cassette 100 is usually arranged vertically in a normal use.

In the embodiments of the present disclosure, a cross section of the beam 122 may have a rectangular or square shape, so that it is convenient for the tissue 4 to be clamped in the accommodating chamber 121 between the beams 122. However, the present disclosure is not limited to this. For example, the cross section of the beam 122 may have another shape matching with an outer contour of the tissue 4.

In addition, as shown in FIG. 5, a part of an outer surface of the peripheral wall 11 may be inclined outwards from an upper end of the peripheral wall 11 to a lower end of the peripheral wall 11, and a label may be adhered on the part of the outer surface of the peripheral wall 11. The label may contain information associated with a patient.

In some embodiments of the present disclosure, each of the first pair of opposite side portions of the peripheral wall 11 has a mounting notch 14 in an end (i.e. an upper end) adjacent to the first opening 1211 of the accommodating member 121, the mounting notches 14 of the first pair of opposite side portions of the peripheral wall 11 open towards each other, and a plurality of positioning members 15 are provided in the mounting notch 14 and arranged on two opposite side walls of the mounting notch 14.

Figure 7:
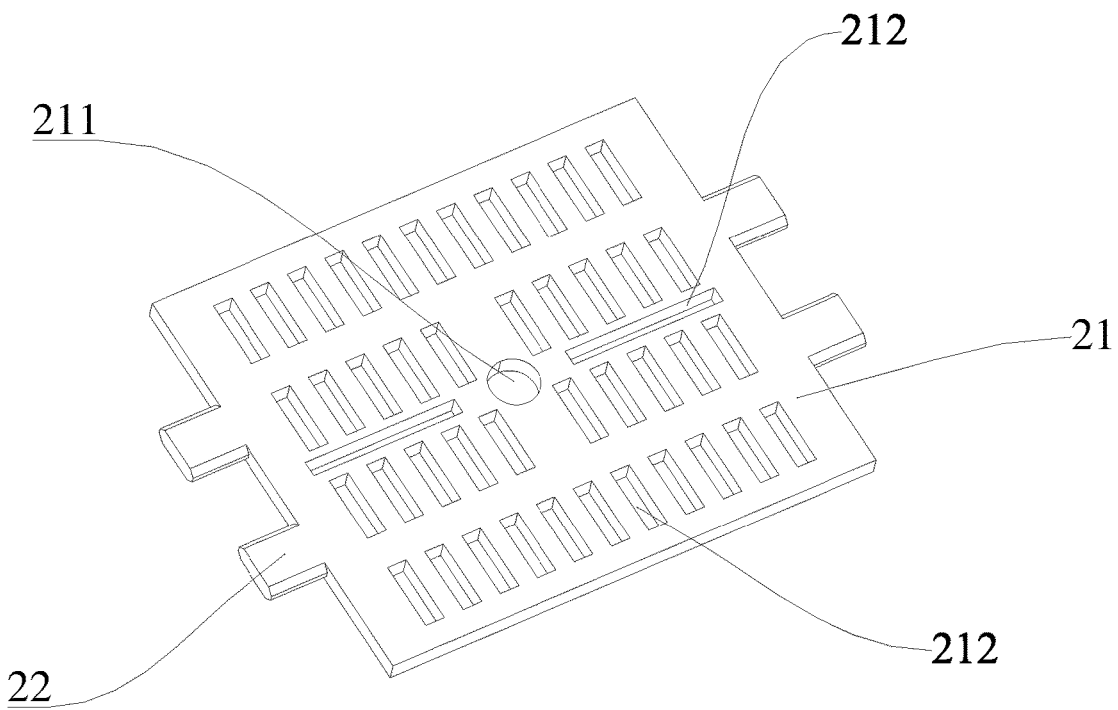
FIG. 7 is a perspective view of a first holder of a cassette according to an embodiment of the present disclosure.

Accordingly, as shown in FIG. 7, the first holder 2 includes a plate body 21 and a mounting protrusion 22, the mounting protrusion 22 is arranged on each of two side walls of the plate body 21 facing away from each other, and the two side walls of the plate body 21 are opposite the first pair of opposite side portions of the peripheral wall 11, respectively. The mounting protrusion 22 is mounted in the mounting notch 14 and positioned by the plurality of positioning members 15.

Specifically, a part of the upper end of each of the first pair of opposite side portions of the peripheral wall 11 is cut away in a direction perpendicular to extension direction of the first pair of opposite side portions of the peripheral wall 11, so as to form the mounting notch 14. The mounting notches 14 in the first pair of opposite side portions of the peripheral wall 11 open towards each other, and each mounting notch 14 has two side walls facing towards each other in the extension direction of the first pair of opposite side portions of the peripheral wall 11. Some positioning members 15 are arranged on one of the two side walls of the mounting notch 14, and other positioning members 15 are arranged on the other one of the two side walls of the mounting notch 14. The positioning members 15 arranged on the one of the two side walls of the mounting notch 14 are aligned with the positioning members 15 arranged on the other one of the two side walls of the mounting notch 14, respectively.

Thus, the mounting protrusion 22 can be stably mounted (even at different heights) in the mounting notch 14 through being fitted with the plurality of positioning members 15.

Further, the plurality of positioning members 15 may be configured as serrations, the mounting protrusion 22 may have a flat shape, and side walls of the mounting protrusion 22 to be fitted with the positioning members 15 are chamfered. Thus, it is convenient for the mounting protrusion 22 to be fitted with the positioning members 15 and further to be vertically adjusted between adjacent positioning members 15.

In some embodiments of the present disclosure, as shown in FIGS. 5 and 7, the plate body 21 has a rectangular shape, two mounting protrusions 22 are provided on each of the two short side walls of the plate body 21 and arranged symmetrical with respect to a center line of the plate body 21, which is perpendicular to the two short side walls of the plate body 21, and two mounting notches 14 are also provided in each of the first pair of opposite side portions of the peripheral wall 11 and correspond with the two mounting protrusions 22 one to one. Thus, at each of the first pair of opposite side portions of the peripheral wall 11, the two mounting protrusions 22 are fitted in the two mounting notches 14 respectively, so that the first holder 2 can be mounted in the frame 1 more stably.

Furthermore, the first holder 2 also includes a first through hole 211 in a center of the plate body 21, and a plurality of second through holes 212 surrounding the first through hole 211. The plurality of second through holes 212 are arranged in columns and rows, and the second through holes 212 arranged in each column or in each row at least partially overlap with a corresponding accommodating member 121.

Specifically, as shown in FIG. 7, the second through holes 212 may have different sizes. For example, a part of the second through holes 212 may have a cross section of a small rectangle, and another part of the second through holes 212 may have a cross section of a large rectangle. The second through holes 212 having the cross section of the small rectangle are arranged in four rows parallel to the above center line of the plate body 21, a long edge of each of these second through hole 212 is perpendicular to the above center line of the plate body 21, and one first through hole 211 having a cross section of a circle is arranged between two middle rows of the second through holes 212 and in middle of each row. The second through holes 212 having the cross section of the large rectangle are arranged in one row parallel to the above center line of the plate body 21 and between the two middle rows of the second through holes 212 having the cross section of the small rectangle, a long edge of each of these second through hole 212 is parallel to the above center line of the first holder 2, and the one first through hole 211 is arranged in middle of the one row and between two adjacent second through holes 212. For example, two second through holes 212 having the cross section of the large rectangle are provided, and one second through hole 212 having the cross section of the large rectangle is arranged on either side of the one first through hole 211 along the above center line of the first holder 2.

The paraffin for embedding the tissue 4 may be supplied through the first through hole 211. Since the second through holes 212 arranged in each column or in each row at least partially overlap with a corresponding accommodating member 121, a pusher 300 may pass through the second through holes 212 to push the tissue 4 in the accommodating member 121 into a mold 200 on which the cassette 100 is arranged.

The pusher 300 may include a plate or a grid and a plurality of rods arranged on the plate or the grid, and the plurality of rods may have cross sections of different shapes, so that the plurality of rods can correspond to and pass through the plurality of second through holes 212. Further, the shapes of the cross sections of the rods and the shapes of the cross sections of the second through holes 212 are not limited herein, as long as the cross sections of the rods correspond with the cross sections of the second through holes 212, and the rods can pass through the second through holes 21 smoothly. In addition, the shape of the cross section of the first through hole 211 is also not limited herein, and may be configured according to actual requirements.

Furthermore, the dehydration reagent can pass through both the first through hole 211 and the second through holes 212 during the processing of the tissue 4.

In some embodiments of the present disclosure, as shown in FIGS. 5 and 6, each of the first pair of opposite side portions of the peripheral wall 11 is provided a first flange 13 at an end (i.e. a lower end) adjacent to the second opening 1212 of the accommodating chamber 121, the first flanges 13 at the first pair of opposite side portions of the peripheral wall 11 extend toward each other, and each first flange 13 defines a sliding channel 17 together with a corresponding one of the first pair of opposite side portions of the peripheral wall 11.

Further, an inner surface of each of the first pair of opposite side portions of the peripheral wall 11 includes a step 18 between the end adjacent to the first opening 1211 of the accommodating chamber 121 and the end adjacent to the second opening 1212 of the accommodating chamber 121, and each first flange 13 and the step 18 of the corresponding one of the first pair of opposite side portions of the peripheral wall 11 define the sliding channel 17 therebetween.

Specifically, the lower ends of the first pair of opposite side portions of the peripheral wall 11 are provided the first flanges 13 extending towards each other, and the inner surface of each of the first pair of opposite side portions of the peripheral wall 11 has the step 18 between its lower end and its upper end, so that the first flange 13 and the step 18 define the sliding channel 17 therebetween.

Thus, it is convenient to form the sliding channel 17, and the second holder 3 can be slid relative to the frame 1 along the sliding channel 17 to open or close the second opening 1212 of the accommodating chamber 121.

In some embodiments, one of the second pair of opposite side portions of the peripheral wall 11 is provided with a recess 19 to expose the sliding channels 17 at the first pair of opposite side portions of the peripheral wall 11 and to allow the second holder 3 to pass through, and the other one of the second pair of opposite side portions of the peripheral wall 11 blocks the sliding channels 17 at the first pair of opposite side portions of the peripheral wall 11.

In this case, the second holder 3 can be slid into the frame 1 along the sliding channels 17 through the recess 19 of the one of the second pair of opposite side portions of the peripheral wall 11, and also can be stopped by the other one of the second pair of opposite side portions of the peripheral wall 11, so that the second holder 3 can be easily closed in position. That is, when the second holder 2 is stopped by the other one of the second pair of opposite side portions of the peripheral wall 11, it indicates that the second holder 3 is closed in position.

Further, the second holder 3 can also be slid out of the frame 1 along the sliding channels 17 through the recess 19 of the one of the second pair of opposite side portions of the peripheral wall 11.

In some embodiments of the present disclosure, the frame 1 has a rectangular shape, i.e. the first pair of opposite side portions of the peripheral wall 11 are shorter than the second pair of opposite side portions of the peripheral wall 11. Thus, a relatively long tissue 4 (such as skin, bowel, tissues for long needle biopsy, and so on) can be received in the accommodating chamber 121, and the second holder 3 can be slide into or out of the frame 1 by a short stroke, thereby satisfying the various requirements for the tissues 4 and improving the embedding efficiency of the tissue 4.

Further, in the embodiments of the present disclosure, the recess 19 may include a first part corresponding to the sliding channel 17 and a second part communicated with the first part, so that the sliding channels 17 are exposed and the second holder 3 can pass through the one of the second pair of opposite side portions of the peripheral wall 11. For example, two first parts are provided to correspond with the two sliding channels 17 respectively, and one second part is provided and communicated between the two first parts.

In some embodiments, bottom surfaces of the second holder 3 and the frame 1 are flush with each other, i.e. the bottom surfaces of the second holder 3, the first pair of opposite side portions of the peripheral wall 11, and the other one of the second pair of opposite side portions of the peripheral wall 11 are flush with one another. Thus, the cassette 100 can be placed on the mold stably and steady.

Figure 8:
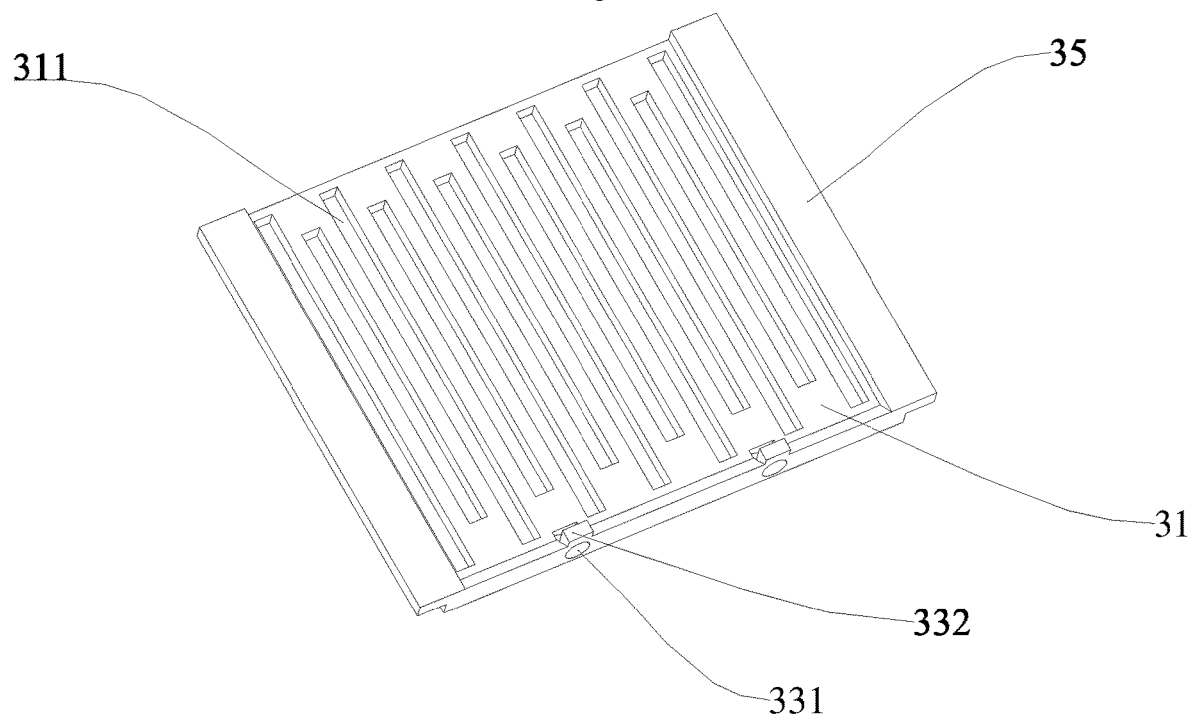
FIG. 8 is a perspective view of a second holder of a cassette according to an embodiment of the present disclosure.

In some embodiments of the present disclosure, as shown in FIGS. 8 and 9, the second holder 3 includes a base plate 31, first to third side walls 32, 33, 34, and a second flange 35. The base plate 31 is provided with a plurality of third through holes 311, so as to allow the reagents to pass through. The first to third side walls 32, 33, 34 are arranged on the base plate 31 and connected in sequence along a periphery of the base plate 31. The first side wall 32 is opposite to the third side wall 34, and the second side wall 33 is connected between the first side wall 32 and the third side wall 34. Thus, a side of the second holder 3 opposite to the second side wall 33 is open, so that the second holder 3 can be slid into or out of the frame 1. That is, the open side of the second holder 3 is configured to receive the one of the second pair of opposite side portions of the peripheral wall 11. The second flange 35 is arranged to an end (i.e. an upper end in FIG. 8) of each of the first side wall 32 and the third side wall 34 away from the base plate 31. The second flanges 35 at the first side wall 32 and the third side wall 34 extend away from each other. The second flange 35 is fitted in the sliding channel 17 and configured to slide in the sliding channel 17.

Since the second flange 35 is slidably fitted in the sliding channel 17, and the side of the second holder 3 opposite to the second side wall 33 is open, the second holder 3 can be slid into or out of the frame 1 to close or open the second opening 1212 of the accommodating chamber 121.

In some embodiments, the plurality of third through holes 311 are parallel to one another and arranged in a direction parallel to an extension direction of the plurality of beams 122. Further, a size of the third through hole 311 in a direction perpendicular to the extension direction of the plurality of beams 122 is less than a size of the accommodating chamber 121 in the direction perpendicular to the extension direction of the plurality of beams 122.

In this case, since the size of the third through hole 311 is less than the size of the accommodating chamber 121 in the direction perpendicular to the extension direction of the plurality of beams 122, the tissue 4 can be prevented from falling out of the accommodating chamber 121 through the second opening 1212, and also the reagents can pass through the base plate 31 smoothly through the third through holes 311. Thus, it is convenient for the relative arrangement of the third through holes 311 and the beams 1212.

In some other embodiments, the plurality of third through holes 311 are parallel to one another and arranged in a direction intersecting with the extension direction of the plurality of beams 122 at an included angle, and the included angle is less than or equal to 90 degrees, and larger than 0 degrees.

In this case, since the direction in which the plurality of third through holes 311 are arranged intersects with the extension direction of the plurality of beams 122 at this included angle, the tissue 4 can be prevented from falling out of the accommodating chamber 121 through the second opening 1212, and also the reagents can pass through the base plate 31 smoothly through the third through holes 311, without defining that the size of the third through hole 311 is less than the size of the accommodating chamber 121 in the direction perpendicular to the extension direction of the plurality of beams 122. Thus, it is convenient for the size configuration of the third through hole 311.

In further embodiments of the present disclosure, as shown in FIGS. 8 and 9, the second side wall 33 of the second holder 3 is provided with an actuating hole 331 and a positioning protrusion 332 aligned with the actuating hole 331, and the positioning protrusion 332 extends from a surface (i.e. an upper surface in FIG. 8) of the second side wall 33 facing away from the base plate 31 in a direction running away from the base plate 31.

A driving member may be fitted in the actuating hole 331 to pull the second holder 3 out of the frame 1 under an action of an external force. For example, the driving member may be a pull rod having an end bent perpendicularly, and the bent end of the pull rod may be inserted into the actuating hole 331 to hock the positioning protrusion 332.

The positioning protrusion 332 strengths the actuating hole 331 so that the pull rod can be fitted in the actuating hole 331 and pull the positioning protrusion 332, so that the second holder 3 can be slid out of the frame 1 stably and reliably.

Further, the second holder 3 may be pushed by the pull rod or another tool or hands to slide into the frame 1.

In some embodiments of the present disclosure, as shown in FIG. 6, the one of the second pair of opposite side portions of the peripheral wall 11 is provided with a positioning groove 16 corresponding to the positioning protrusion 332 of the second side wall 33 of the second holder 3, and the positioning protrusion 332 is configured to be fitted in the positioning groove 16 when the second holder 3 closes the second opening 1212 of the accommodating chamber 121.

Thus, when the second holder 3 is slid into the frame 3 to close the second opening 1212 of the accommodating chamber 121, the positioning protrusion 332 is fitted in the positioning groove 16, so as to position the second holder 3 in an extension direction of the second side wall 33. Thus, the second holder 3 can be mounted stably in place to close the second opening 1212 of the accommodating chamber 121, under the positioning of the other one of the second pair of opposite side portions of the peripheral wall 11 as well as the positioning of the positioning protrusion 332 and the positioning groove 16.

In some embodiments, two positioning protrusions 332 may be provided on the second side wall 33 of the second holder 3 and spaced apart from each other. Accordingly, two positioning grooves 16 should also be formed in the one of the second pair of opposite side portions of the peripheral wall 11, and correspond with the two positioning protrusions 332 one to one. The two positioning protrusions 332 are fitted in the two positioning grooves 16 respectively, when the second holder 3 closes the second opening 1212 of the accommodating chamber 121.

In some embodiments of the present disclosure, as shown in FIGS. 6, 8 and 9, surfaces of the second side wall 33 of the second holder 3 and the one of the second pair of opposite side portions of the peripheral wall 11, which face towards each other, are inclined in a same direction, so that the surface of the second side wall 33 of the second holder 3 is fitted with the surface of the one of the second pair of opposite side portions of the peripheral wall 11 when the second holder 3 closes the second opening 1212 of the accommodating chamber 121.

Thus, due to the fit of the inclined surface of the second side wall 33 of the second holder 3 and the inclined surface of the one of the second pair of opposite side portions of the peripheral wall 11, the second holder 3 can be mounted in place more stably. Further, a collision between the second holder 3 and the frame 1 can be reduced, thus improving their service life.

Embodiments of the present disclosure further provide an embedding method 1000, which uses the cassette 100 according to the above embodiments of the present disclosure, as shown in FIGS. 10-13. The embedding method 1000 includes following steps shown in FIG. 11.

At step 1001, the cassette 100 with the tissue 4 is placed on a mold 200, in which the first holder 2 closes the first opening 1211 of the accommodating chamber 121 and the second holder 3 closes the second opening 1212 of the accommodating chamber 121, as shown in FIG. 10A. In this case, the tissue 4 is held in the accommodating chamber 121 by the first holder 2 and the second holder 3.

At step 1002, liquid paraffin is dispensed into the cassette 100 and the mold 200, and the liquid paraffin is cooled in the mold 200 to a semi-molten state, as shown in FIG. 10B. That is, the liquid paraffin is pre-dispensed into the cassette 100 and the mold 200. Thus, the paraffin in the semi-molten state can position the tissue 4 to an extent when the tissue 4 is pushed into the mold 200.

At step 1003, the second holder 3 is slid to open the second opening 1212 of the accommodating chamber 121, as shown in FIG. 10C. In this case, the tissue 4 will not fall into the mold 200 due to clamping of the beams 122, and also due to support of the paraffin in the semi-molten state in the mold 200 when the paraffin immerses at least part of the tissue 4.

At step 1004, the tissue 4 is pushed into the mold 200, as shown in FIG. 10D. When an enough external force is applied to the tissue 4, the tissue 4 can be pushed into the mold 200 against the clamping of the beams 122, and also against the support of the paraffin in the semi-molten state in the mold 200 when the paraffin immerses at least part of the tissue 4.

At step 1005, the second holder 3 is slid to close the second opening 1212 of the accommodating chamber 121, as shown in FIG. 10E.

At step 1006, further liquid paraffin is dispensed into the cassette 100 and the mold 200, as shown in FIG. 10F. That is, additional liquid paraffin is further dispensed into the cassette 100 and the mold 200 for final-dispensing.

At step 1007, the liquid paraffin is cooled in the cassette 100 and the mold 200 to a solid state, as shown in FIG. 10H.

In the embedding method 1000 according to the embodiments of the present disclosure, since the first holder 2 is detachably connected to the frame 1 and the second holder 3 is slidably connected to the frame 1, they can be operated to open or close the openings of the accommodating chamber 121 in corresponding steps, so that the tissue 4 can be pushed into the mold 200 without being taken out of the cassette 100, and the paraffin block including the tissue 4 can be obtained without the second holder 3 (i.e. the bottom part of the cassette 100). That is, the bottom part of the cassette 100 does not need to be cut, and no cassette material remains around the tissue 4. Thus, the lifetime of a blade of a microtome is improved, and the slides quality and the slides viewing and diagnosing are improved. Further, it is easy and convenient to embed the tissue 4 with the embedding method 1000, thus enhancing the working efficiency of a user.

In some embodiments of the present disclosure, the tissue 4 is pushed into the mold 200 by the pusher 300, as shown in FIGS. 10D, 10E and 10F.

In this case, the embedding method 1000 further includes step 1008. At step 1008, the pusher 300 is withdrawn, as shown in FIG. 10G. Specifically, the pusher 300 may be withdrawn after or before further liquid paraffin is dispensed into the cassette 100 and the mold 200, as shown in FIGS. 12 and 13.

Figure 12:
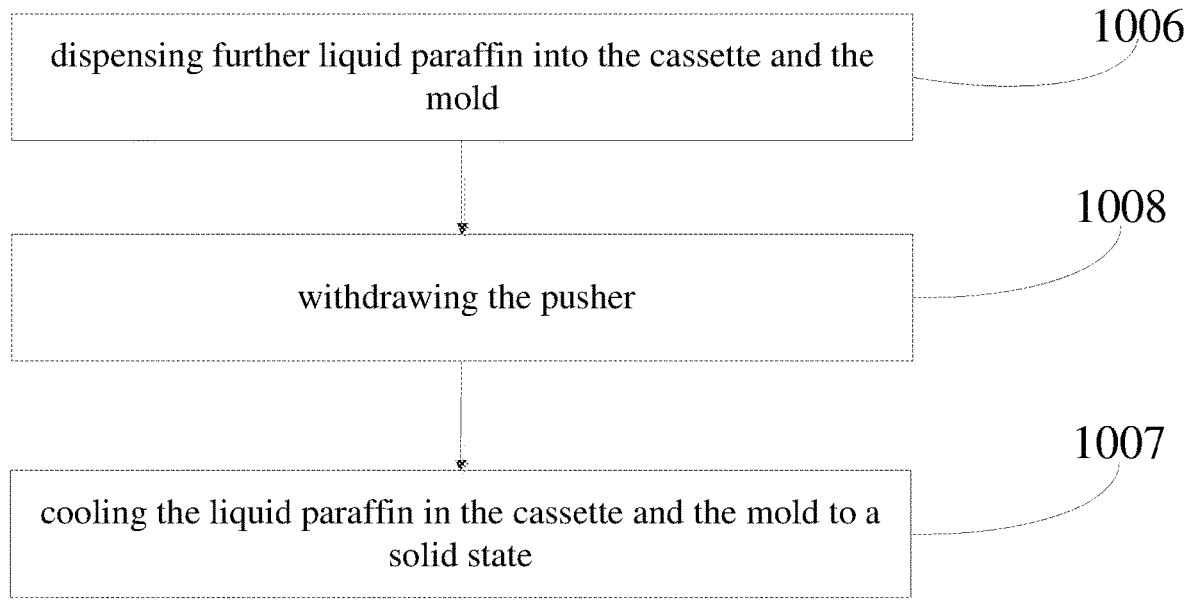
FIG. 12 is a block diagram of an embedding method according to an embodiment of the present disclosure.
Figure 13:
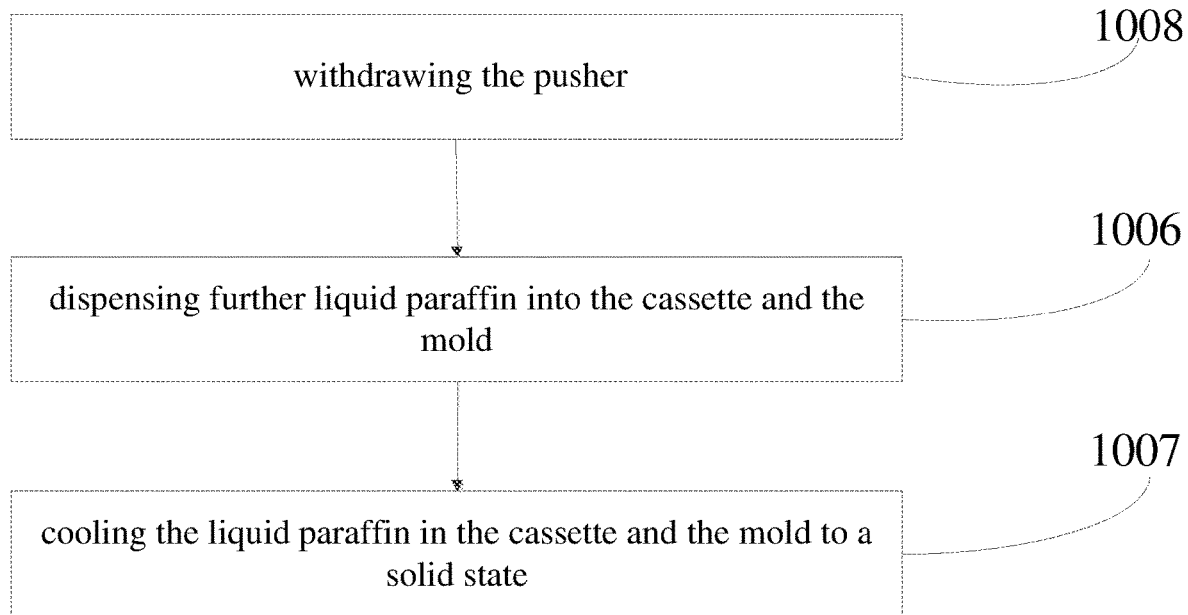
FIG. 13 is a block diagram of an embedding method according to an embodiment of the present disclosure.

Specifically, as shown in FIG. 12, the pusher 300 is withdrawn after further liquid paraffin is dispensed into the cassette 100 and the mold 200; as shown in FIG. 13, the pusher 300 is withdrawn before further liquid paraffin is dispensed into the cassette 100 and the mold 200.

FIG. 10 illustrates that the pusher 300 is withdrawn after further liquid paraffin is dispensed into the cassette 100 and the mold 200.

In either above case, the desired paraffin block including the tissue 4 can be obtained.

It should be noted that steps 1001-1005 should also be included in the embedding methods 1000 shown in FIGS. 12 and 13, but are omitted for simplification herein.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cassette for a tissue, comprising:
a frame comprising an accommodating member, the accommodating member defining an accommodating chamber and configured to accommodate the tissue in the accommodating chamber, the accommodating chamber having a first opening and a second opening opposite to each other;
a first holder detachably connected to the frame, and closing the first opening of the accommodating chamber; and
a second holder connected to the frame, and configured to slide relative to the frame to open or close the second opening of the accommodating chamber;
wherein the frame comprises a peripheral wall, and the accommodating member is surrounded by the peripheral wall,
the peripheral wall comprises a first pair of opposite side portions and a second pair of opposite side portions, the first pair of opposite side portions are connected between the second pair of opposite side portions,
the accommodating member comprises a plurality of beams arranged parallel to and spaced apart from one another, each two adjacent beams define the accommodating chamber therebetween, and each beam is arranged between and connected to the first pair of opposite side portions of the peripheral wall;
wherein each of the first pair of opposite side portions of the peripheral wall has a mounting notch in an end adjacent to the first opening of the accommodating member, the mounting notches of the first pair of opposite side portions of the peripheral wall open towards each other, and a plurality of positioning members are provided in the mounting notch and arranged on two opposite side walls of the mounting notch.

2. The cassette according to claim 1, wherein the first holder comprises: a plate body ; and
a mounting protrusion arranged on each of two side walls of the plate body facing away from each other, the two side walls of the plate body being opposite to the first pair of opposite side portions of the peripheral wall, respectively,
wherein the mounting protrusion is mounted in the mounting notch and positioned by the plurality of positioning members.

3. The cassette according to claim 2, wherein the first holder further comprises a first through hole in a center of the plate body, and a plurality of second through holes surrounding the first through hole,
the plurality of second through holes are arranged in columns and rows, and the second through holes arranged in each column or in each row at least partially overlap with a corresponding accommodating member.

4. An embedding method, using a cassette for a tissue according to claim 1, the embedding method comprising:
placing the cassette with the tissue on a mold, in which the first holder closes the first opening of the accommodating chamber, and the second holder closes the second opening of the accommodating chamber;

dispensing liquid paraffin into the mold and the cassette, and cooling the liquid paraffin in the mold to a semi-molten state;

sliding the second holder to open the second opening of the accommodating chamber;

pushing the tissue into the mold;

sliding the second holder to close the second opening of the accommodating chamber;

dispensing further liquid paraffin into the mold and the cassette; and cooling the liquid paraffin in the cassette and the mold to a solid state.

5. The embedding method according to claim 4, wherein the tissue is pushed into the mold by a pusher, and the embedding method further comprises withdrawing the pusher after or before dispensing further liquid paraffin into the mold and the cassette.

6. A cassette for a tissue, comprising:
a frame comprising an accommodating member, the accommodating member defining an accommodating chamber and configured to accommodate the tissue in the accommodating chamber, the accommodating chamber having a first opening and a second opening opposite to each other;
a first holder detachably connected to the frame, and closing the first opening of the accommodating chamber; and
a second holder connected to the frame, and configured to slide relative to the frame to open or close the second opening of the accommodating chamber;
wherein the frame comprises a peripheral wall, and the accommodating member is surrounded by the peripheral wall,
the peripheral wall comprises a first pair of opposite side portions and a second pair of opposite side portions, the first pair of opposite side portions are connected between the second pair of opposite side portions,
the accommodating member comprises a plurality of beams arranged parallel to and spaced apart from one another, each two adjacent beams define the accommodating chamber therebetween, and each beam is arranged between and connected to the first pair of opposite side portions of the peripheral wall;
wherein each of the first pair of opposite side portions of the peripheral wall is provided a first flange at an end adjacent to the second opening of the accommodating chamber, the first flanges at the first pair of opposite side portions of the peripheral wall extend toward each other, and each first flange defines a sliding channel together with a corresponding one of the first pair of opposite side portions of the peripheral wall.

7. The cassette according to claim 6, wherein an inner surface of each of the first pair of opposite side portions of the peripheral wall comprises a step between an end adjacent to the first opening of the accommodating chamber and the end adjacent to the second opening of the accommodating chamber,
each first flange and the step of the corresponding one of the first pair of opposite side portions of the peripheral wall define the sliding channel therebetween.

8. The cassette according to claim 6, wherein one of the second pair of opposite side portions of the peripheral wall is provided with a recess to expose the sliding channels at the first pair of opposite side portions of the peripheral wall and to allow the second holder to pass through, and the other one of the second pair of opposite side portions of the peripheral wall blocks the sliding channels at the first pair of opposite side portions of the peripheral wall.

9. The cassette according to claim 8, wherein the second holder comprises:
a base plate provided with a plurality of third through holes;
first to third side walls arranged on the base plate and connected in sequence along a periphery of the base plate, the first side wall being opposite to the third side wall, the second side wall being connected between the first side wall and the third side wall; and
a second flange arranged to an end of each of the first side wall and the third side wall away from the base plate, the second flanges at the first side wall and the third side wall extending away from each other, the second flange being fitted in the sliding channel and configured to slide in the sliding channel.

10. The cassette according to claim 9, wherein the plurality of third through holes are parallel to one another and arranged in a direction parallel to an extension direction of the plurality of beams,
a size of the third through in a direction perpendicular to the extension direction of the plurality of beams is less than a size of the accommodating chamber in the direction perpendicular to the extension direction of the plurality of beams.

11. The cassette according to claim 9, wherein the plurality of third through holes are parallel to one another and arranged in a direction intersecting with an extension direction of the plurality of beams at an included angle, and the included angle is less than or equal to 90 degrees, and larger than 0 degrees.

12. The cassette according to claim 9, wherein the second side wall of the second holder is provided with an actuating hole and a positioning protrusion aligned with the actuating hole, and the positioning protrusion extends from a surface of the second side wall facing away from the base plate in a direction running away from the base plate.

13. The cassette according to claim 12, wherein the one of the second pair of opposite side portions of the peripheral wall is provided with a positioning groove corresponding to the positioning protrusion of the second side wall of the second holder, and the positioning protrusion is configured to be fitted in the positioning groove when the second holder closes the second opening of the accommodating chamber.

14. The cassette according to claim 9, wherein surfaces of the second side wall of the second holder and the one of the second pair of opposite side portions of the peripheral wall, which face towards each other, are inclined in a same direction, so that the surface of the second side wall of the second holder is fitted with the surface of the one of the second pair of opposite side portions of the peripheral wall when the second holder closes the second opening of the accommodating chamber.

* * * * *